United States Patent [19]

Blaschke

[11] 3,896,351
[45] July 22, 1975

[54] CONTROL ARRANGEMENT FOR A SELF-CONTROLLED SYNCHRONOUS MACHINE

[75] Inventor: Felix Blaschke, Erlangen, Germany

[73] Assignee: Siemens Aktiengesellschaft, Munich, Germany

[22] Filed: Aug. 19, 1974

[21] Appl. No.: 498,751

[30] Foreign Application Priority Data

Aug. 23, 1973 Germany............................ 2342653

[52] U.S. Cl. ................ 318/175; 318/178; 318/230
[51] Int. Cl. ............................................. H02p 5/28
[58] Field of Search ........... 318/174, 175, 178, 227, 318/230

[56] References Cited
UNITED STATES PATENTS 3,612,970  10/1971  Sofan................................. 318/175
3,775,649  11/1973  Bayer et al....................... 318/227 X
3,796,935  3/1974  Blaschke............................ 318/227

Primary Examiner—G. Z. Rubinson
Attorney, Agent, or Firm—Kenyon & Kenyon Reilly Carr & Chapin

[57] ABSTRACT

An improved control arrangement for a self-controlled synchronous machine of the type whose stator components are controlled in a field-oriented manner in which means are provided to also control the excitation current in a field-oriented manner with respect to its field-parallel component by applying an anticipatory control to the excitation current in the form the reciprocal value of the cosine of the rotor angle. Through this measure, the magnetizing component of the excitation current is kept constant without the necessity of changing the magnetizing component of the stator current.

7 Claims, 2 Drawing Figures

T.C. Z. TRANSFORMATION CIRCUIT

T.C., Z. TRANSFORMATION CIRCUIT 3,896,351

CONTROL ARRANGEMENT FOR A SELF-CONTROLLED SYNCHRONOUS MACHINE

BACKGROUND OF THE INVENTION

This invention relates to self-controlled synchronous machines in general, and more particularly to an improved arrangement for regulating such machines.

A control arrangement for a self-controlled synchronous machine which is stator-fed and which has an excitation current control, a flux computer and is operated with respect to predetermined field-parallel and field-orthogonal components is disclosed in U.S. application Ser. No. 266,643, now U.S. Pat. No. 3,775,649 assigned to the same assignee as the present invention. In the arrangement disclosed therein the active and reactive components of the stator current are controlled independently of each other in such a synchronous machine. For the purpose of improving the dynamic operation in the excitation control circuit upon the occurrence of load discontinuities, that patent suggests changing the field-parallel component of the stator current, i.e., the reactive current of the synchronous machine, in order to aid the excitation current control where a transition from one stationary state to another takes place. In many applications, however, even this temporary change of the amount of reactive power absorbed or given off by the machine resulting from such control can have an undesirable effect.

In view of this problem, it is the object of the present invention to maintain constant flux even during dynamic transitions without the need to change the magnetizing component of the stator current to accomplish this.

SUMMARY OF THE INVENTION

The present invention solves this problem in a basic control arrangement such as that disclosed in the above identified patent by supplying to the excitation current control, as a reference value, the output signal of a quotient generator whose dividend input is obtained from means providing an output quantity proportional to the desired magnetizing current and whose divisor input is a quantity proportional to the cosine of the rotor angle. Stated simply, the basic principle of the present invention is to also control the excitation current in a field-oriented manner with respect to its field-parallel component.

In the simplest case, the quantity fed to the dividend input can be a constant control quantity thereby causing the excitation current reference value to be predetermined in a controlled manner. However, it is also possible to use in addition, a flux control set to the reference value. In such a case, the latter needs only to compensate for possible inaccuracies of the control.

Where the synchronous machine is to be used to supply reactive power, in accordance with a further feature of the present invention, it is advantageous to feed to the dividend input an additional quantity proportional to the reference value or to the actual value of the field-parallel stator current component.

DETAILED DESCRIPTION OF THE PREFERRED EMBODIMENT

Figure 1:
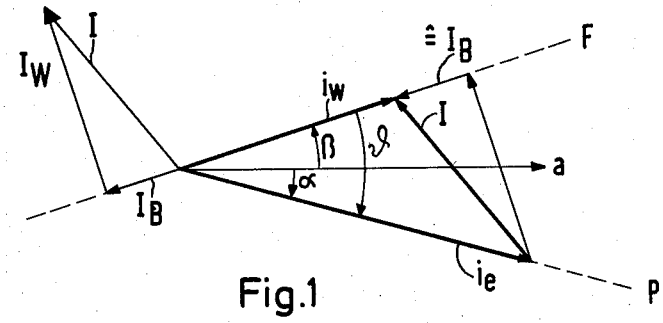
FIG. 1 is a reference diagram of the currents of an overexcited synchronous machine operated as a motor.

FIG. 1 is a vector diagram for the currents in an overexcited synchronous machine operated as a motor. F designates the axis of the rotating field and P the axis of the rotor. The angle between the axes F and P is referred to as the rotor angle I. The rotor axis P subtends an angle with respect to an axis $a$ fixed with respect to the stator. This axis will be assumed to be coincident with the axis of the stator winding. The rotating-field axis F subtends the angle B with the axis $a$. As is evident from the vector diagram, the magnetizing component of the excitation current $i_e$, which points in a direction of the field axis, is composed of the constant no-load magnetizing current $i_w$ and a component which corresponds to the field parallel component $I_B$ of the stator current I. Only the component $i_e \cdot \cos \theta$ of the excitation current $i_e$ is thus effective in the direction of the magnetic field. For every change of magnetizing current by a predetermined amount, a change in the magnitude of the excitation current $i_e$ greater the factor of $1/\cos \theta$ is required.

Figure 2:
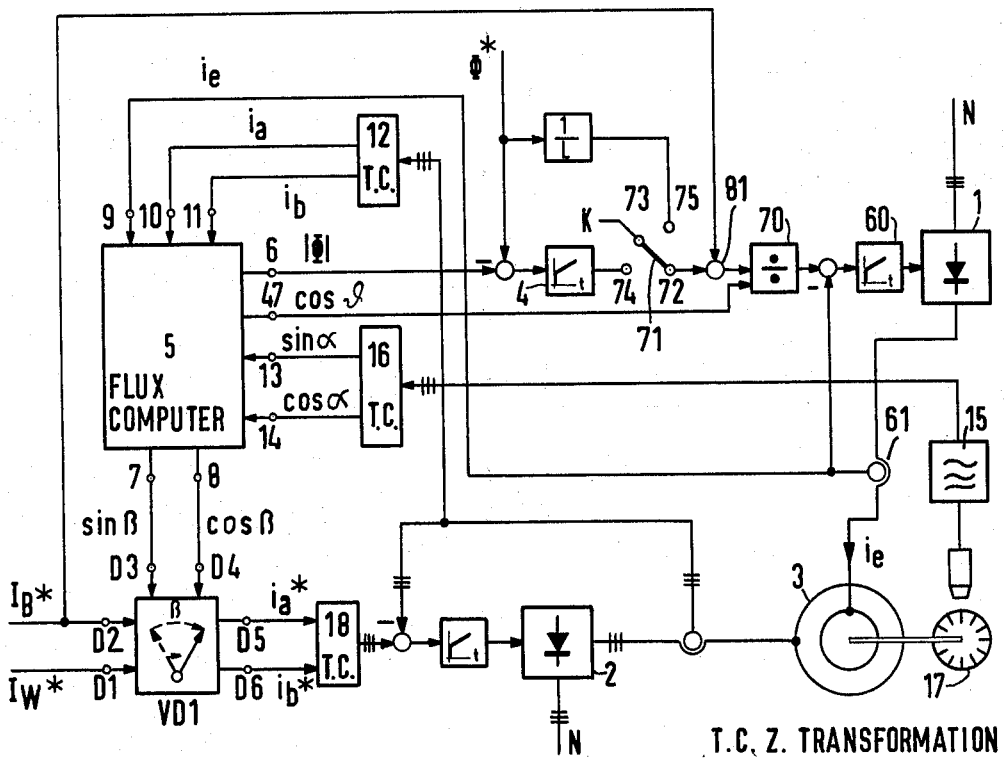
FIG. 2 is a block diagram of a field-oriented control system for a synchronous motor which incorporates the improvement of the present invention.

FIG. 2 illustrates a block diagram of a system for the field-oriented control of a synchronous machine. Basically, this is the same as the control system described in the above referenced U.S. Pat. No. 3,775,649, the disclosure of which is hereby incorporated by reference. The basic operation of the portion common to the present system will only be briefly described and for more details, that patent should be referred to. The same reference numerals and symbols are used herein as were used in that patent. As illustrated, a three-phase system designated N supplies the rotor windings of a synchronous machine 3 through a controlled rectifier 1. The stator of the motor 3 is supplied from the same three-phase system N through a second controlled rectifier 2. The output of a pulse disk 17 sensing the rotor position is provided through a three-phase generator 15 and through a further transformation circuit 16 to terminals 13 and 14 of the flux computer 5. Here, the components $\sin \alpha$ and $\cos \alpha$ representing the position of vector P with respect to the reference vector $a$ are provided. The flux computer 5 itself is described in detail in the above referenced patent. A further input obtained from a current transformer is provided at terminal 9 representing the excitation current along with inputs at terminals 10 and 11 representing the quantities $i_a$ and $i_b$, which describe the stator current vector in a coordinate system fixed in space. These quantities are obtained from a second three-phase transformation circuit 12 obtaining its input from a current transformer at the input to the stator. From these various input quantities, the flux computer develops two voltages $\sin \beta$ and $\cos \beta$ at terminals 7 and 8 respectively which describe the instantaneous position of the rotating field axis F in a coordinate system referred to the stator. They also develop at terminal 6 a quantity proportional to the magnitude of the air gap flux and at the terminal 47 an output voltage proportional to the cosine of the rotor angle $\theta$. Note that in FIG. 6 of the above identified patent, this quantity is used only internally to develop $\cos \beta$ and $\sin \beta$. However, in the present application, this quantity at terminal 47 is brought out as an output with the aid of the vector rotator VD1, permits the components of the stator vector current to be set in a field-oriented manner, i.e., field-orthogonal with the desired value $I_B^*$. For the purpose of regulating the excitation current $i_e$, an excitation an excitation current control 60 is provided. It is in this area that the present invention deviates from that of the prior referenced patent. The reference value input to the excitation control 60 is the output signal of a quotient generator or analog divider 70 whose divisor input is coupled to the terminal 47 of the flux computer. The actual current $i_e$ from the current transformer 61 is compared with the reference value at the input summing junction of the current control 60 in conventional fashion. The signal fed as the dividend input to the divider 70 is the sum of the field parallel stator current component reference value $I_B^*$ and an additional quantity. This addition is accomplished at a summing junction 81. The summing junction may be a summing junction available at the input to the divider 70 or may be the summing junction of a summing amplifier installed for that purpose. The second quantity which makes up the sum is provided at terminal 72. In the position shown, a jumper 71 is placed between the terminal 72 and a terminal 73. The input to terminal 73 is a constant quantity designated K. In such a case, the reference value of the excitation current control 60 is preset in a controlled manner and would have a magnitude as follows:

$$i_e^* = (K + I_B^*)/\cos \Theta.$$

If the quantity K corresponds to the no-lead magnetizing current, then the reference value set for the excitation current control 60 would correspond exactly to the value required for maintaining a constant air gap flux while the rotor angle changes. The use of a flux control is thus not a basic necessity unless more stringent requirements are set for the constancy of the flux. If such is the case, the output of a flux regulator 4 is connected to the divider input. This is done by connecting the jumper 71 between terminals 72 and 74. With such an arrangement, the flux regulator 4 is then aided in its task by the quotient generator 70. It keeps the magnetic flux constant since any change of the output voltage of the flux regulator 4 has a direct and linear effect as a corresponding change in the magnetizing component of the excitation current $i$. The dynamic operation of the system can be further improved by compensating for a deviation of the flux actually present from the desired flux value $\Phi^*$ which is the preset reference value through a connection, by an additional jumper not shown, between the terminals 72 and 75 in addition to the jumper 71 between the terminals 72 and 75. In this case, the predetermined quantity $\Phi^*$ acts as an anticipatory control with a magnitude $\Phi^*/L$, having first been provided through a proportional member such as an operational amplifier having a gain of 1/L. L is the inductance of the exciter winding. This provides the desired value of excitation current to the excitation control 60 with almost no delay. In such a case, the flux regulator 4, in a practical sense, only compensates for inaccuracies which occur in the signal processing and which are caused by the tolerances of the components. This last embodiment thus constitutes an extremely fast and at the same time highly accurate type of flux control.

It will be recognized by those skilled in the art that controllers 4 and 60 may simply be operational amplifier integrator controllers.

Thus, an improved manner of controlling excitation current in a self-controlled synchronous machine has been shown. Although various embodiments have been illustrated and described, it will be obvious to those skilled in the art that various modifications may be made without departing from the spirit of the invention which is intended to be limited solely by the appended claims.

What is claimed is:

1. In a converter fed, self-controlled synchronous machine having an excitation current control, a flux computer having as one output the cosine of the rotor angle and means to establish predetermined field-parallel and field-orthogonal components of the stator current, an improved regulating arrangement comprising; dividing means having its output coupled as a reference input to the excitation control and having as a dividend input a quantity proportional to the desired magnetizing current and as a divisor input, a quantity proportional to the cosine of the rotor angle obtained from the flux computer.

2. An arrangement according to claim 1 wherein the dividend input to said dividing means is a constant control quantity.

3. An arrangement according to claim 2 wherein said dividend input has an additional input, a quantity proportional to a reference value $I_B^*$ representing the desired field parallel stator current component.

4. An arrangement according to claim 1 wherein a flux regulator having as inputs at its summing junction, a desired flux and a computed flux value obtained from said flux computer is provided and wherein the output of said flux regulator is the dividend input to said dividing means.

5. An arrangement according to claim 4 wherein said dividend input has an additional input, a quantity proportional to a reference value $I_B^*$ representing the desired field parallel stator current component.

6. The arrangement according to claim 5 and further including an amplifier having a gain of 1/L where L is the excitation inductance in said machine, said amplifier having as an input a reference quantity representing a desired flux and providing its output as an additional input to said dividend input.

7. The arrangement according to claim 1 and further including an amplifier having a gain of 1/L where L is the excitation inductance in said machine, said amplifier having as an input a reference quantity proportional to a desired flux and providing its output as said dividend input.

* * * * *

UNITED STATES PATENT AND TRADEMARK OFFICE
CERTIFICATE OF CORRECTION

PATENT NO. : 3 896 351
DATED : July 22, 1975
INVENTOR(S) : Felix Blaschke

It is certified that error appears in the above-identified patent and that said Letters Patent are hereby corrected as shown below:

In column 3, line 27, change "to the no-lead" to

--to the no-load--

Signed and Sealed this twenty-fifth Day of November 1975

[SEAL]

Attest:

RUTH C. MASON
*Attesting Officer*

C. MARSHALL DANN
*Commissioner of Patents and Trademarks*